Patented June 10, 1941

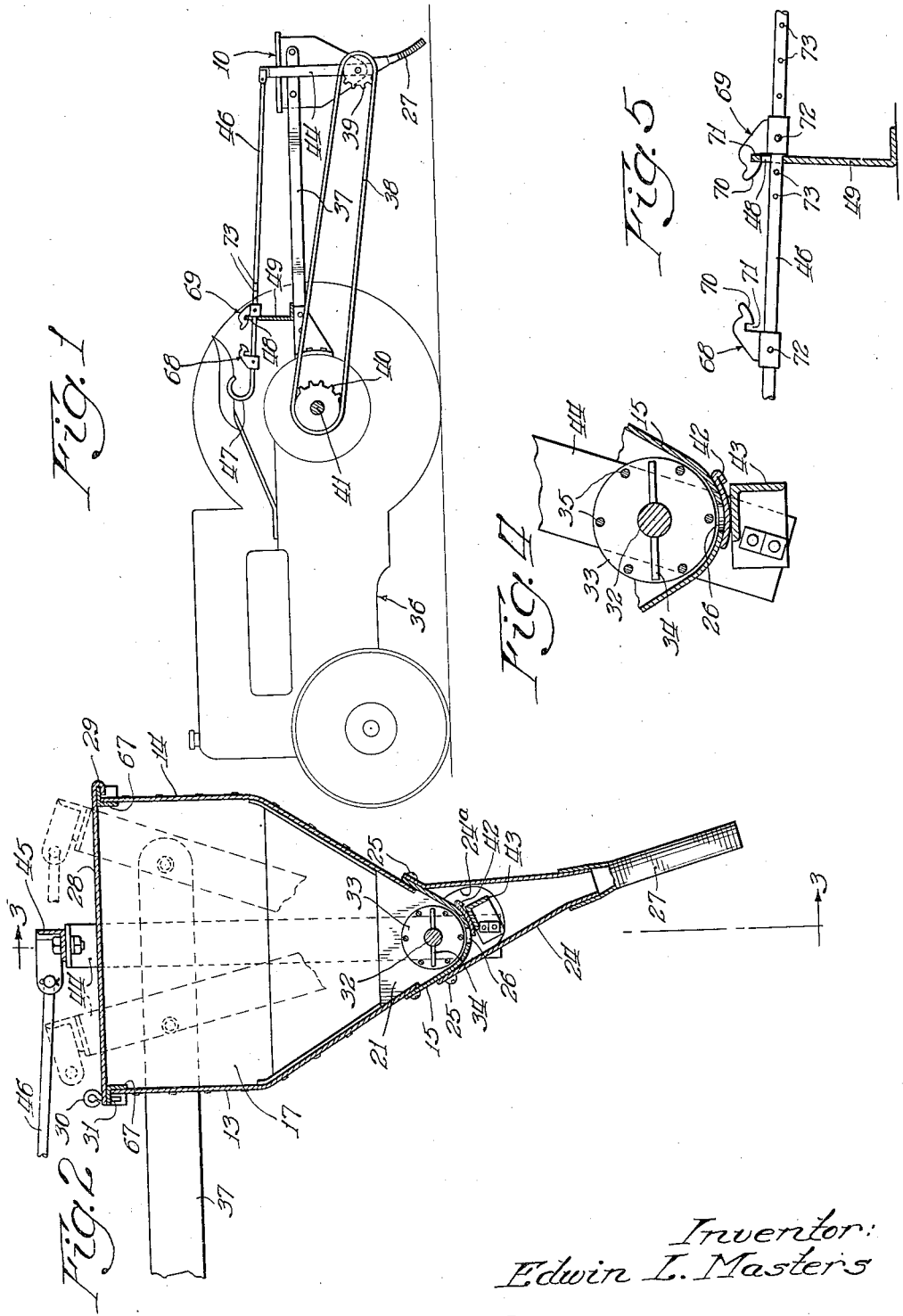

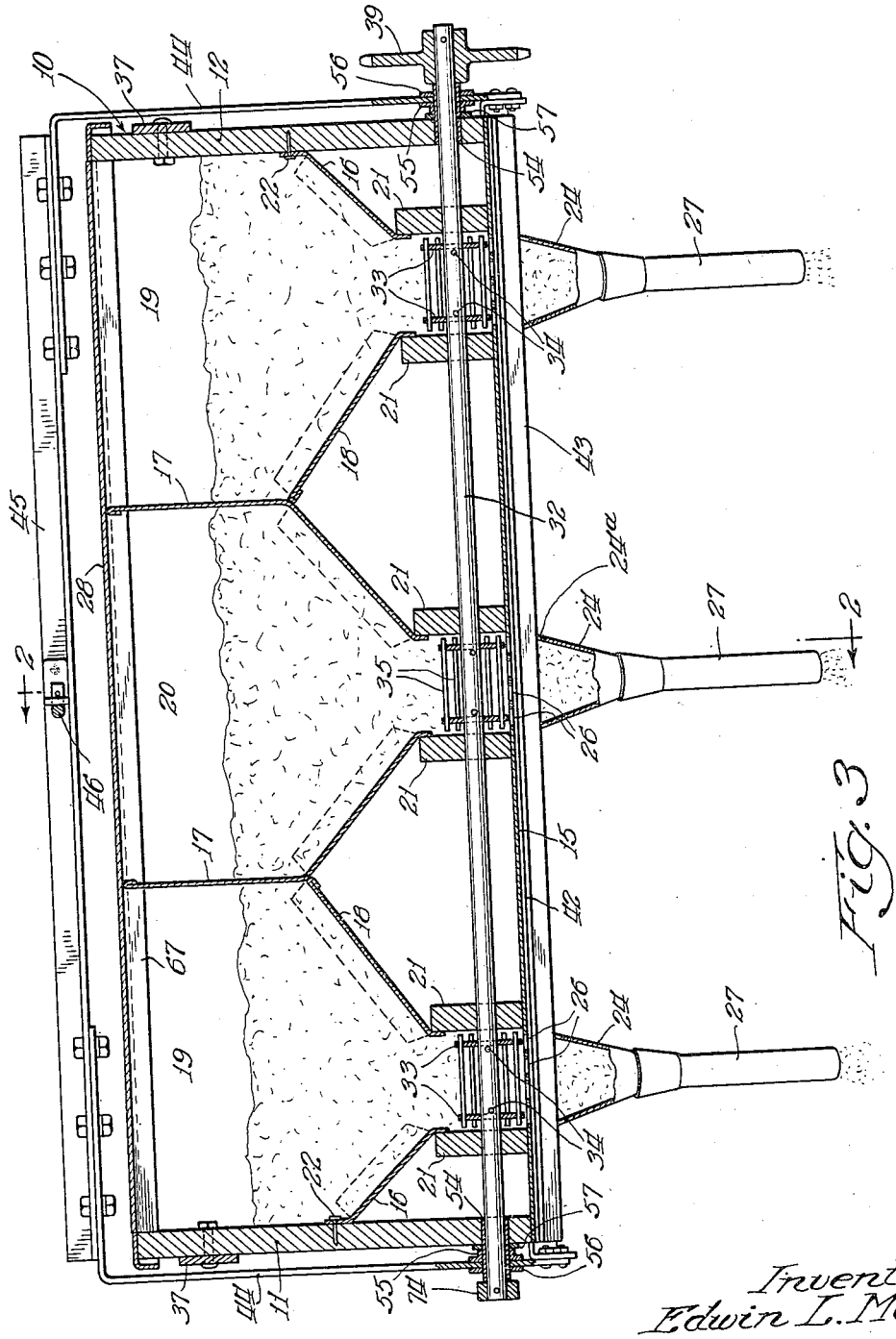

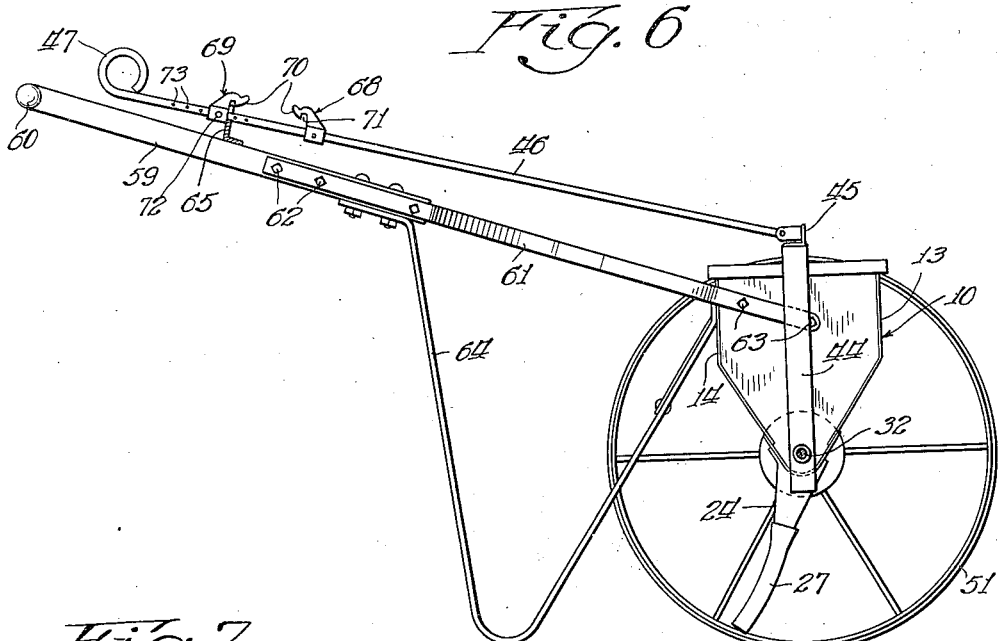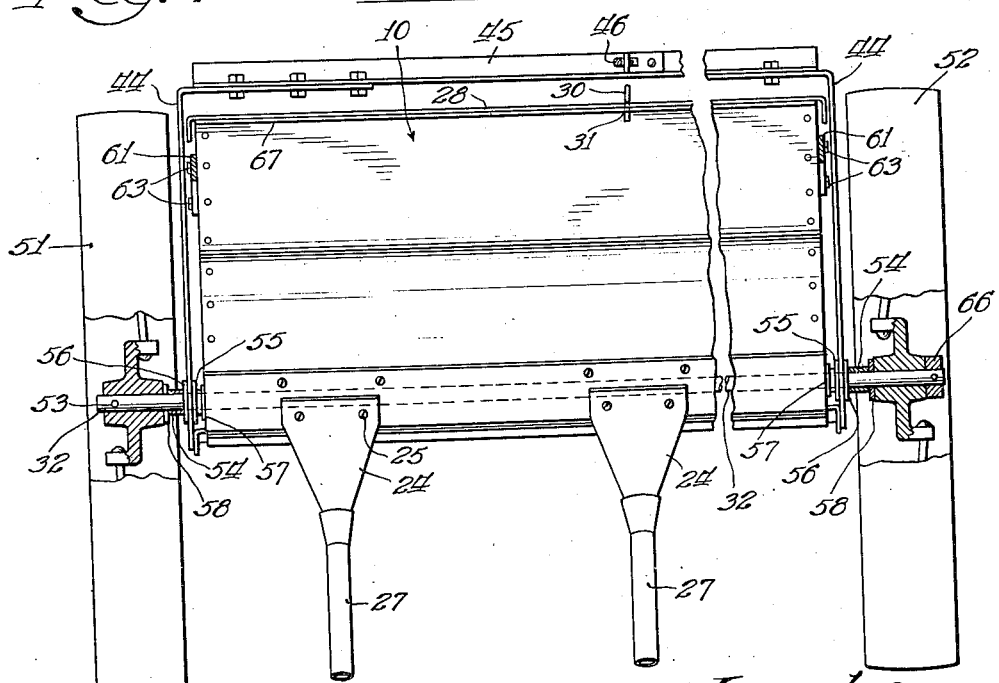

2,245,152

UNITED STATES PATENT OFFICE 2,245,152

FERTILIZER DISTRIBUTOR

Edwin L. Masters, Chicago, Ill.

Application February 4, 1939, Serial No. 254,545

2 Claims. (Cl. 221—122)

The invention relates to material distributors, and more particularly it relates to devices for distributing various materials such as fertilizers which are in finely divided or powdered or granulated form, and also are adapted for sowing seeds of various kinds.

It is well known that many field crops are planted in rows, and it is found in practice that if fertilizers are concentrated in strips corresponding to the rows of vegetation, rather than spread over the ground surface, approximately one-half of the fertilizer used for even distribution will, if concentrated in the rows, result in a larger crop than by the use of the larger amount when spread over the entire surface of the soil.

The structure of the present invention is especially adapted for distributing fertilizing materials of the kind described, and also seeds in a plurality of relatively narrow parallel bands or strips corresponding in spacings to existing or future rows of vegetation to be fertilized or planted.

It is an object of the invention to provide a distributor for materials of the kind described which is light, durable and capable of being either mounted on and forming an attachment for a vehicle such as a tractor or the like or being mounted on wheels and actuated by hand or other suitable tractive power.

Another object of the invention is to provide a device by which substantially even or uniform distribution of such materials over a plurality of narrow equally spaced apart strips of soil may be obtained and whereby the spacing of such strips may be varied in conformity with the spacing of the vegetation to be planted or fertilized.

A further object of the invention is the provision of means for controlling the quantity of material to be delivered in bands or rows.

Still another object of the invention is the provision in a device of the kind described having a plurality of hoppers, of novel means for simultaneously delivering the contents of the various hoppers at the same rate in combination with manually operable means for controlling the discharge from the hoppers whereby the device may be transported to or from the points of distribution without discharging any of the material and the rate of discharge may be varied as desired while the device is in operation.

A further object of the invention is the provision of a device of the kind described which is simple, durable, inexpensive to manufacture and generally satisfactory for its intended purpose.

Many other objects and advantages of the construction herein shown and described will be obvious to those skilled in the art from the disclosure herein given.

To this end, the invention consists in the novel construction, arrangement and combination of parts herein shown and described and more particularly pointed out in the appended claims.

Referring now to the drawings wherein like reference characters indicate like or corresponding parts:

Fig. 1 is a diagrammatic elevational view showing the device as an attachment mounted on and actuated by a tractor;

Fig. 2 is a vertical sectional view of the device taken along the line 2—2 of Fig. 3;

Fig. 3 is a sectional view taken along the line 3—3 of Fig. 2;

Fig. 4 is a view through a feeding device positioned in the bottom of each hopper and drawn to a larger scale to more clearly show the details of construction;

Fig. 5 is a large scale view of certain details of feed control mechanism;

Fig. 6 is an end elevational and sectional view of an alternative embodiment of the invention illustrating the device as mounted on wheels and provided with a tongue and handle adapting it for manual traction and operation; and Fig. 7 is a fragmentary front elevational view partially in section of the device shown in Fig. 6.

The illustrated embodiments of the invention each comprise a container generally designated by the numeral 10 and comprising end walls 11 and 12 and downwardly extending tapering front and rear side walls 13 and 14, respectively. The end walls 11 and 12 are preferably constructed of timber and are connected with the side walls 13 and 14 in any suitable manner such as by nails or screws not shown. The lower converging edges of the side walls 13 and 14 are connected by a plate 15 forming the bottom of the container, the plate being preferably arcuate in cross section and extending downwardly from the side plates.

A plurality of transversely extending partition plates 16, 17 and 18, connected with the container walls, are shown as providing end hoppers 19 and an intermediate hopper 20 within the container 10, it being understood that any desired number of intermediate hoppers 20 may be provided by increasing the number of plates 17 and 18. The bottom of each hopper is bounded by a pair of spaced apart blocks 21. The outer blocks 21 of the end hoppers 19 are respectively connected with the end walls 13 and 14 of the container 10 by the inclined plates 16, the edges of the plates having flanges suitably formed to fit the contiguous container walls and the adjacent blocks 21 and being fastened to the end walls and the blocks by nails 22 or the like and to the side walls 13 and 14 preferably by welding. The intermediate hopper 20 is bounded by the partition plates 17, the lower portion of the plates being oppositely inclined and their upper end portions being vertical. The edges of plates 17 are turned to provide flanges respectively adapted to fit the contiguous blocks 21 and the side walls of the container and are fastened to the block and the walls by means similar to the fastening means described for the plates 16. The vertical portions of the plates 17 also serve as bounding walls for the upper portion of the adjacent end hoppers 19 and are respectively connected by the plates 18 with the inner blocks 21 of the adjacent end hoppers. The plates 18 form inclined walls for the hoppers 19 and have one edge turned to provide a double thickness closely fitting the adjacent plate 17. The remaining edges of the plates 18 are so inclined and turned as to form flanges respectively fitting the front and rear side walls of the container and the continguous block 21 and are fastened thereto by means similar to those described for the plates 16 and 17. The construction and arrangement of the partition plates 16, 17 and 18 and their cooperation with the container walls as described provide hoppers 19 and 20 convergent toward the bottom on four sides so that the contents of the hoppers will readily flow by gravity into the spaces between the blocks 21 comprising the bottom portions of the hoppers.

A plurality of funnel shaped members 24, respectively positioned underneath the bottom of the hoppers 19 and 20 and fastened to both sides of the container 10 by screw bolts 25, are each adapted to receive the contents of the hoppers delivered through a plurality of apertures 26 provided in the portions of the container plate 15 forming the bottoms of the respective hoppers.

A plurality of flexible metal tubes 27 extending downwardly from the members 24, are provided to receive the material discharged through the members and to deliver it on the ground in narrow bands or strips conforming substantially in width to the inner diameters of the tubes. The upper ends of the members 24 are recessed slightly and extend upwardly a sufficient distance on opposite sides of the container plate 15 and in slightly spaced relation thereto to provide guides and windshields preventing loss of the material when operating the device in windy weather.

Marginal members 67 of any suitable shape, and shown as angle bars, extend around the top of the container 10 to provide rigidity and a seat for a cover member 28. The cover member 28 is secured to the container 10 by providing one edge with a fold 29 adapted to engage the contiguous member 67 and the other edge with a bolt or stud 30 arranged to be seated in a socket member 31, the cover member being removable by lifting to disengage the bolt and socket member and moving the cover to disengage the fold and the marginal member.

An agitator and feeding device is provided to prevent arching and packing of the material in the bottom of the hoppers and to facilitate uniform discharge of the material through the apertures 26. The agitator and feeding device comprises a shaft 32 journaled in the blocks 21, the shaft being also journaled in and projecting through the end walls 11 and 12 of the container 10. A pair of spaced apart discs 33 are mounted on the shaft 32, in the bottom of each hopper, the discs each being fastened to the shaft and caused to rotate therewith by a pin 34 extending through the shaft and having one end turned and operatively engaging the adjacent disc. Each pair of discs 33 has a plurality of circumferentially arranged rods 35 extending therethrough and so spaced that their revolution by the shaft serves to deliver or maintain sufficient material on the container plate 15 to permit constant and uniform discharge of such material through the apertures 26.

As shown in Fig. 1, the device is attached to and supported by the rear portion of a tractor 36 by means of bars 37 shown as fastened to the ends of the container 10. Any suitable means for rotating the shaft 32 may be provided and in Figs. 1 and 3, the actuating means is shown as comprising a sprocket chain 38 engaging a sprocket wheel 39 mounted on one end of the shaft and driven by a sprocket wheel 40 mounted on the rear axle 41 of the tractor.

The tractor, carrying the device as an attachment, can be moved from place to place without actuating the shaft 32 by providing a clutch, not shown, for operatively disengaging one or the other of the sprocket wheels 39 or 40 with its axle. Since the materials to be distributed are frequently of a character such that they will flow by gravity through the apertures 26 when the shaft 32 is not rotating, a manually operable closure device for the apertures is provided. The closure device consists of a plate 42 having a concave face adapted to closely fit the outer convex face of the container plate 15 and thereby to close the apertures. The plate 42 is oscillatable through an arc to cover and uncover the apertures 26 and extends substantially the full length of the container 10. An angle bar 43, fastened to the plate 42, preferably by welding, provides the necessary rigidity to prevent the plate from sagging and to maintain it in close fitting contact with the apertured plate 15. The bar 43 is supported at its end by bars 44 respectively carried by and oscillatable about the adjacent projecting ends of the shaft 32 as axes. The upper ends of the bars 44 project inwardly above the top of the container 10 and are connected by an angle bar 45. The bars 44 are oscillatable to correspondingly move the closure plate 42 by means of an arm 46 having one end pivotally connected with the angle bar 45 intermediate its ends and its other end terminating adjacent the driver's seat of the tractor and providing a handle member 47 so positioned as to be easily grasped and manipulated by the driver. The arm 46 extends through and loosely fits in a vertically elongated slot 48 formed in a member 49 which is provided as a support for the forward end of the arm.

The position of the arm 46, as shown in Fig. 1, corresponds to the full line position of the arm and of the bars 44, as shown in Fig. 2 in which position the plate 42 only partially covers the apertures 26. Longitudinal movement of the arm to the right as observed in Fig. 1 rotates the bars 44 in clockwise direction to the position shown in Fig. 4 wherein the plate 42 fully covers the apertures 26. The members 24 provide recesses 24a in their opposite sides through which the plate 42 and the angle bar 46 extend, the recesses being sufficiently large to permit limited swinging movement of the plate and bar therein.

In order that the longitudinal movement of the arm 46 in either direction may be limited and the amount of movement of the plate 42 by the bars 44 be adjustable to permit only partial uncovering of the apertures 26, a pawl 68 and a pawl 69 are fixedly mounted on the arm on the opposite sides of the member 49. Each of the pawls 68 and 69 has a cam face 70 and a notch 71 so arranged and positioned that longitudinal movement of the arm 46 to operatively engage the cam face of either pawl with the member 49 will elevate the pawl and arm and permit the pawl to slide over the top of the member to a position wherein the member enters the notch 71 and holds the arm fixedly in position. In order that the arm 46 may be moved in the opposite direction, it is necessary that it be lifted to a position wherein the pawl will disengage the member 49. The position of the pawl 68 is such that its engagement with the member 49 holds the arm 46 in the completely closed position of the plate 42 as shown in Fig. 4. The device is adjustable to vary the rate at which material is delivered through the apertures 26 by limiting the movement of the plate 42 so that it will only partially uncover the apertures and for this purpose, the pawl 69 is adjustably fastened to the arm 46 by a removable pin 72 insertable in any one of a plurality of longitudinally spaced apart holes 73 provided in the arm. The arm hole 73 most remote from the handle 47 is so positioned that when the pawl 69 is fastened to the arm 46 by inserting the pin 72 therein, the pawl will operatively engage the member 49 only when the plate 42 is moved to fully uncover the apertures 26. When the pawl 69 is connected with the arm 46 by insertion of its pin 72 through any one of the other holes 73, the plate 42 can be correspondingly moved to only partially uncover the apertures 26, it being understood that the spacing and the position of the holes 73 are such that the apertures 26 may thereby be selectively uncovered in slightly different amounts within a range from full closure to complete opening of the apertures.

A modified form of construction embodying the invention is shown in Figs. 6 and 7, the same being identical with the form shown in Figs. 1 to 5, inclusive, other than as hereinafter described. In the modified form of construction, the ends of the shaft 32 project substantially beyond the end walls of the container to receive supporting wheels 51 and 52 whereby the device is operable independently of any other vehicle. The wheel 51 is rigidly connected with the shaft 32 by means of a pin 53 whereby rotation of the wheel also causes the shaft to rotate. The wheel 52 is maintained in position by a cap or band 66 and is rotatable on the shaft 32 to facilitate turning of the device. The device is guided and adapted to be manually propelled by means of a rearwardly projecting tongue member hereinafter more particularly described.

Since the weight of the container 10 and its contents is carried by the shaft 32 and the container is adapted for use both as a tractor attachment and as an independently operated vehicle, special journal bearings are provided for the shaft at each end of the container. The bearings each comprise a sleeve 54 fixedly mounted in the adjacent end wall of the container and extending through the contiguous bar 44. In the construction shown in Figs. 1 to 4, a collar 55, angular in cross section, is welded on the inner face of each bar 44 to provide a cylindrical bearing on the supporting sleeve 54 and thereby avoids unequal wear of the sleeves by direct contact therewith of the bars which would otherwise result from their frequent oscillation and prevent accurate adjustment of the closure plate 42 by such oscillation of the bars. The bars 44 are each held against movement longitudinally outwardly of the shaft 32 by means of an outer ring 56 spot-welded or otherwise fixedly mounted on the sleeve 54 and are also held against movement inwardly on the shaft by an inner ring 57 bearing against the adjacent end wall of the container as shown in Fig. 3. The sleeve 54 at the driving end of the shaft 32 bears against the sprocket 39 and the sleeve 54 at the other end of the shaft bears against a cap 74 to prevent longitudinal movement of the shaft relative to the container.

In the modified form of the invention as shown in Fig. 6, the shaft 32 projects sufficiently to receive the wheels 51 and 52 and a ring or washer 58 is positioned between the ends of the sleeves 54 and the hubs of the wheels 51 and 52 to provide end bearings for the wheels, the connection of the bars 44 with the shaft being otherwise the same as above described for the construction shown in Fig. 3.

The tongue member comprises a bar 59 having a handle 60 on its outer end and a pair of diagonally inclined plates 61 connected therewith by bolts 62 or the like. The plates 61 are rigidly fastened to the ends of the container 10 in any suitable manner such as by bolts 63. The plates 61 extend at an angle such that, when the handle 60 is at a convenient elevation for pushing or pulling the device, the side walls of the container 10 are approximately vertical and the combined weight of the container and its contents is substantially balanced on the shaft 32. A downwardly and upwardly inclined plate 64, fastened at one end to the bar 59 and at the other end of the adjacent side wall of the container 10, provides a ground support for the tongue member when the device is stationary. The relative inclinations of the tongue member and container are such that a portion of the weight of the container and its contents is carried by the support when the handle member is tilted so that it rests upon the ground.

A member 65 similar to the member 49 and fastened to the bar 59 provides a support for the arm 46. In this construction, the arm 46 projects rearwardly from the container above and in proximity to the tongue member with the handle member 47 of the arm positioned contiguous to the handle 60 of the tongue member. The arm 46 thus arranged to overlie the handle member is manually operable to actuate the closure plate 42 and thereby to control the rate of delivery of the hopper contents in the same manner as above described for the device when used as a tractor attachment.

Although the device is shown and described as having three hoppers, it is understood that any other suitable number of hoppers may be provided and that the spacing of the bands or strips of delivered material may be doubled by leaving intermediate hoppers 20 empty and if the number of hoppers be sufficiently increased, triple or greater multiples of the spacings of the strips may be accomplished by placing material in the corresponding hoppers and leaving the others empty. The members 27 being flexible, it is also possible to utilize two adjacent hoppers for delivery of the material in closely spaced bands on opposite sides of a row of plants to be fertilized by inclining the members laterally so that their lower ends are in proximity.

Thus, it will be seen that I have provided a novel device for distributing material of the kind described in a plurality of parallel equally or otherwise spaced bands or strips and which is so constructed as to be used either as an attachment for mounting on a tractor or other vehicle and in its modified form is adapted for mounting on wheels for operation as an independently propelled vehicle.

It is thought that further details of the utility and operation of my invention will be apparent and while I have herein set forth certain preferred embodiments of my invention it is understood that I may vary from the same in minor structural details so as best to construct a practical device for the purposes intended, not departing from the spirit of the invention and within the scope of the appended claims.

What I claim as new and desire to secure by Letters Patent is:

1. A material distributor of the kind described including an elongated container bounded by end walls connected by a bottom plate and by front and rear side walls also connected by said bottom plate, said container being divided into a plurality of disconnected hoppers by two inwardly and downwardly inclined plates respectively connected with each end wall and said side walls, a plurality of oppositely and downwardly inclined transverse partition plates arranged in pairs and closely connected with said side walls, a plurality of transversely extending blocks arranged in pairs in the bottom of the container, the blocks comprising each pair being spaced apart and having a close connection with the bottom and side walls of the container and with the contiguous downwardly inclined plates to provide a relatively restricted space at the bottom of each hopper, said bottom wall providing a discharge aperture in each restricted hopper space, a shaft extending through said end walls and blocks, means operable to rotate the shaft, and a plurality of agitators rotatable with the shaft and respectively positioned in said restricted spaces.

2. A material distributor of the kind described including an elongated container bounded by end walls connected by an arcuate bottom plate and by front and rear side walls convergent towards and also connected by said bottom plate, said container being divided into a plurality of disconnected hoppers by two inwardly and downwardly inclined plates respectively closely connected with each end wall and said side walls, a plurality of oppositely and downwardly inclined transverse partition plates arranged in pairs and closely connected with said side walls, a plurality of blocks arranged in pairs in the bottom of and extending transversely to the container, the blocks comprising each pair being spaced apart and having a close connection with the bottom and side walls of the container and with the contiguous downwardly inclined plates to provide a relatively restricted space at the bottom of each hopper, said bottom wall providing a discharge aperture in each restricted hopper space, a shaft extending through said end walls and blocks, means operable to rotate the shaft, a plurality of agitators rotatable with the shaft and respectively positioned in said restricted spaces, and means operable to simultaneously open and close said discharge aperture in equal amounts.

EDWIN L. MASTERS.